(12) United States Patent
Gonzalez et al.

(10) Patent No.: US 12,335,917 B2
(45) Date of Patent: *Jun. 17, 2025

(54) SCHEMES FOR SSB TO PAGING CORESET MAPPING IN NR

(71) Applicant: Panasonic Intellectual Property Corporation of America, Torrance, CA (US)

(72) Inventors: David Gonzalez, Langen (DE); Ankit Bhamri, Langen (DE); Hidetoshi Suzuki, Kanagawa (JP); Lilei Wang, Beijing (CN)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/649,069

(22) Filed: Apr. 29, 2024

(65) Prior Publication Data

US 2024/0284405 A1 Aug. 22, 2024

Related U.S. Application Data

(63) Continuation of application No. 18/331,720, filed on Jun. 8, 2023, now Pat. No. 12,010,652, which is a
(Continued)

(51) Int. Cl.
*H04W 68/02* (2009.01)
*H04W 56/00* (2009.01)
(Continued)

(52) U.S. Cl.
CPC ......... *H04W 68/02* (2013.01); *H04W 56/001* (2013.01); *H04W 84/027* (2013.01); *H04W 88/185* (2013.01); *H04W 4/023* (2013.01)

(58) Field of Classification Search
CPC . H04W 4/023; H04W 8/18; H04W 16/00–12; H04W 84/022–027;
(Continued)

(56) References Cited

U.S. PATENT DOCUMENTS

2009/0213766 A1* 8/2009 Chindapol ........... H04B 7/2621
370/278
2010/0279715 A1 11/2010 Alanara et al.
(Continued)

FOREIGN PATENT DOCUMENTS

CN 101755475 A 6/2010
CN 101820650 A 9/2010
(Continued)

OTHER PUBLICATIONS

Chinese Office Action dated Mar. 28, 2024, for the corresponding Chinese Patent Application No. 202211273920.1, 14 pages. (With English Translation).
(Continued)

*Primary Examiner* — San Htun
(74) *Attorney, Agent, or Firm* — Seed IP Law Group LLP

(57) ABSTRACT

The present invention relates to a user device, a base station, and data transmission and reception methods to be performed by a user device and a base station in a communications system. The user device comprises circuitry which, in operation, calculates the starting location of a paging region comprising resources in which user devices are paged, the paging region including paging information for paging said user device; and determines an offset with respect to the starting location of the paging region, the offset indicating the location of the paging information for paging said user device relative to the starting location of the paging region.

11 Claims, 7 Drawing Sheets

Related U.S. Application Data continuation of application No. 17/874,836, filed on Jul. 27, 2022, now Pat. No. 11,711,784, which is a continuation of application No. 16/874,041, filed on May 14, 2020, now Pat. No. 11,445,473, which is a continuation of application No. PCT/CN2017/111534, filed on Nov. 17, 2017.

(51) Int. Cl.
    *H04W 84/02*   (2009.01)
    *H04W 88/18*   (2009.01)
    *H04W 4/02*    (2018.01)

(58) Field of Classification Search
    CPC ......... H04W 88/00–06; H04W 88/185; H04W 92/00; H04W 92/08; H04W 92/10; H04W 92/16; H04W 92/18
    See application file for complete search history.

(56) References Cited

U.S. PATENT DOCUMENTS

| | | | | |
|---|---|---|---|---|
| 2011/0134893 | A1* | 6/2011 | Park | H04W 68/02 370/336 |
| 2011/0310854 | A1* | 12/2011 | Zou | H04W 74/0891 370/336 |
| 2012/0122495 | A1 | 5/2012 | Weng et al. | |
| 2017/0094621 | A1 | 3/2017 | Xu et al. | |
| 2017/0257842 | A1* | 9/2017 | Hessler | H04W 56/00 |
| 2017/0367069 | A1* | 12/2017 | Agiwal | H04B 7/088 |
| 2018/0324753 | A1* | 11/2018 | Islam | H04W 68/02 |

FOREIGN PATENT DOCUMENTS

| | | |
|---|---|---|
| CN | 105992342 A | 10/2016 |
| GB | 2566316 A | 3/2019 |
| WO | WO 2017052284 A1 | 3/2017 |
| WO | WO 2017222309 A1 | 12/2017 |

OTHER PUBLICATIONS

Ericsson, "On NR paging design," R1-1711379, Agenda Item: 5.1.1.3, 3GPP TSG-RAN WG1 NR Ad-Hoc#2, Qingdao, P.R. China, Jun. 27-30, 2017, 5 pages.
InterDigital, Inc., "NR paging based on paging indication," R1-1716260, Agenda Item; 6.1.3, 3GPP TSG RAN WG1 Meeting NR#3, Nagoya, Japan, Sep. 18-21, 2017, 4 pages.
ZTE et al., "Paging in NR," R1-1701579, Agenda Item: 8.1.1.3, 3GPP TSG RAN WG1 Meeting #88, Athens, Greece, Feb. 13-17, 2017, 7 pages.
3GPP, "3rd Generation Partnership Project; Technical Specification Group Radio Access Network; Evolved Universal Terrestrial Radio Access (E-UTRA); User Equipment (UE) procedures in idle mode (Release 14)," 3GPP TS 36.304 V14.4.0, Sep. 2017. (49 pages).
Chinese Office Action, dated Jan. 6, 2022, for Chinese Patent Application No. 201780096887.0. (22 pages) (with English translation).
English translation of Japanese Notice of Reasons for Rejection, dated Feb. 28, 2023, for Japanese Patent Application No. 2021-212279. (8 pages).
Ericsson, "Paging design," R1-1718714 (Prev. R1-1716153), Agenda Item: 7.1.3, 3GPP TSG RAN WG1 Meeting #90bis, Prague, Czech Republic, Oct. 9-13, 2017. (6 pages).
European Office Action, dated Mar. 30, 2022, for European Patent Application No. 17 931 916.5-1231. (4 pages).
Huawei, HiSilicon, "Offline summary for AI 7.1.3 on Paging for NR," R1-1718771, Agenda item: 7.1.3, 3GPP TSG RAN WG1 Meeting 90bis, Prague, Czech Republic, Oct. 9-13, 2017. (5 pages).
InterDigital, Inc., "NR paging based on paging indication," R1-1718358 (Prev. R1-1716260), Agenda Item: 7.1.3, 3GPP TSG RAN WG1 Meeting #90bis, Prague, Czech Republic, Oct. 9-13, 2017. (5 pages).
International Search Report, mailed Aug. 7, 2018, for International Patent Application No. PCT/CN2017/111534. (3 pages).
Japanese Office Action, dated Jun. 1, 2021, for Japanese Patent Application No. 2020-522865. (14 pages) (with English translation).
LG Electronics, "Paging design in NR," R1-171929, Agenda Item: 7.1.3, 3GPP TSG RAN WG1 Meeting NR#90bis, Prague, Czech Republic, Oct. 9-13, 2017. (7 pages).
Lien et al., "5G New Radio: Waveform, Frame Structure, Multiple Access, and Initial Access," *IEEE Communications Magazine* 55(6):64-71, Jun. 2017.
Motorola Mobility, Lenovo, "NR paging design," R1-1718695, Agenda item 7.1.3, 3GPP TSG RAN WG1 #90bis, Prague, Czech Republic, Oct. 9-13, 2017. (3 pages).
Nokia, Nokia Shanghai Bell, "Paging in NR," R1-1716527, Agenda item: 6.1.3, 3GPP TSG-RAN1 NR AH#3, Nagoya, Japan, Oct. 18-21, 2017. (8 pages).
NTT Docomo, Inc., "Revised WID on New Radio Access Technology," RP-171418, Agenda Item: 9.2.1, 3GPP TSG RAN Meeting #75, West Palm Beach, USA, Jun. 5-8, 2017. (11 pages).
Panasonic, "Discussion on paging design for NR," R1-1717772, Agenda Item 7.1.3, 3GPP TSG RAN WG1 Meeting #90bis, Prague, Czech Republic, Oct. 9-13, 2017. (3 pages).
Panasonic, "Discussion on paging design for NR," R1-1719704, Agenda Item 7.1.3, 3GPP TSG RAN WG1 Meeting #91, Reno, USA, Nov. 27-Dec. 1, 2017. (4 pages).
Decision to Grant a Patent, dated Aug. 27, 2024, for Japanese Patent Application No. 2023-126941. (5 pages) (with partial English Translation).
Huawei, HiSilicon,"Efficiency of direct and response-driven paging," R2-1709662, Agenda Item: 10.4.2.6, 3GPP TSG RAN WG2 Meeting #99, Berlin, Germany, Aug. 21-25, 2017. (12 pages).
MediaTek Inc.,"Discussion on paging design," R1-1716207, Agenda Item: 6.1.3, 3GPP TSG RAN WG1 Meeting NR#3,Nagoya, Japan, Sep. 18-21, 2017. (8 pages).
Vivo,"Remaining details on NR paging design," R1-1717462, Agenda Item: 7.1.3, 3GPP TSG RAN WG1 Meeting #90bis, Prague, Czech Republic, Oct. 9-13, 2017. (5 pages).

* cited by examiner

SCHEMES FOR SSB TO PAGING CORESET MAPPING IN NR

BACKGROUND

Technical Field

The present disclosure relates to paging of user devices in a communication system.

Description of the Related Art

New Radio (NR) is the technology being developed by the 3rd Generation Partnership Project (3GPP) to be submitted to the International Telecommunications Union as a 5G candidate technology. One of the most notable aspects of NR is the fact that it is being designed taking into account the operation using beamforming (Dahlman et al. "4G, LTE-Advanced Pro and The Road to 5G", 3rd Ed. Elsevier. 2016), which will be especially useful in high frequency bands. Broadly speaking, beamforming allows to concentrate the energy of a given radio transmission in a certain direction, such that the range can be extended to, for instance, compensate the high propagation loss in high frequencies. Given that 5G is expected to operate in high frequencies, where more spectrum is available, beamforming operation is key in NR.

BRIEF SUMMARY

One non-limiting and exemplary embodiment facilitates efficient monitoring of paging messages by a user equipment.

In one general aspect, the techniques disclosed here provide a user device for transmitting and/or receiving data to/from a base station in a communication system. The user device comprises circuitry which, in operation, calculates the starting location of a paging region comprising resources in which user devices are paged, the paging region including paging information for paging said user device, and determines an offset with respect to the starting location of the paging region, the offset indicating the location of the paging information for paging said user device relative to the starting location of the paging region.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 2:
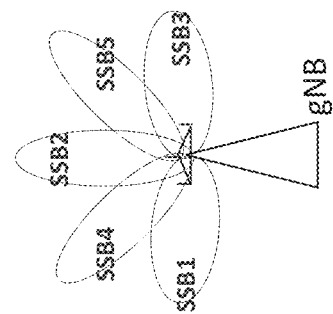
FIG. 2 is an illustration of beamforming performed by a base station.

In order to support beamforming operation, several aspects of NR, including functionalities like time/frequency synchronization and paging, among others, need to be re-designed. This disclosure is about paging design in NR. In the context of cellular systems, paging is a mechanism by which the network locates a UE (in IDLE mode) within a given geographical area referred to as tracking area, possibly composed of several cells, to initiate a connection setup. Since the network does not know the exact geographical position of the UE to be paged, beamformed paging messages (used in NR) need to be transmitted in different directions at different time instants in order to guarantee that the UE to be paged is found. A similar behavior has been already agreed for the synchronization signals providing time and frequency reference to the UE, i.e., these signals are beam-swept (i.e., transmitted on different beams in different time instants) in the cell in such a way that UEs can access the system after obtaining the time-frequency reference and some other information from the so-called Synchronization Blocks (SSBs). Hence, given that SSBs and paging signals/messages present a similar behavior, i.e., both need to be beam-swept, it is expected that certain associations or relationships can be exploited. SSBs are blocks of resources consisting of a predetermined number of symbols in time domain, for instance four symbols) and predetermined number of subcarriers or physical resource blocks. The number of symbols and/or sub-carriers or physical resource blocks may be defined in standard or configurable in system resources. The SSB may carry PPS, SSS and PBCH.

This disclosure provides several schemes/mechanisms to exploit these relationships, such that a more efficient paging operation can be achieved, and in particular, avoiding that UEs monitor the whole time interval in which paging signals are transmitted. Instead, a goal is to provide means so that UEs can listen for possible paging messages only at certain time instants when the network transmits beamformed paging signals in the proper direction in accordance with the location of the UE. Here 'means' refers, for example, to the required signaling/information indicating the actual frequency and time location in which the relevant beamformed paging signals are transmitted.

This disclosure relates to on-going work item on NR access technology (RP-171418—"Revision of WI: New Radio Access Technology", S. Y. Lien, S. L. Shieh, Y. Huang, B. Su, Y. L. Hsu and H. Y. Wei, "5G New Radio: Waveform, Frame Structure, Multiple Access, and Initial Access," in *IEEE Communications Magazine*, vol. 55, no. 6, pp. 64-71, 2017). It is relevant to the "initial access" framework. Initial access includes, among other things, synchronization signals and paging design. In particular, some embodiments provide mechanisms by which SSBs can be associated to the paging, to make more efficient the paging reception at UE side.

The following points summarize the paging operation in LTE, and highlight the similarities and differences in NR.

As indicated previously, paging is used to locate UEs in the so-called tracking area, to initiate a setup connection, when UE is basically in IDLE mode. Therefore, in LTE, a paging message is broadcasted in each cell of the tracking area. This operation based on tracking areas is expected to be similar in NR.

In LTE, to receive paging messages, a mechanism similar to "normal" data transmission is used, i.e., UE first receives and monitors control information (L1/L2 signaling meaning layer 1/layer 2 signaling which refers to physical layer and MAC layer) to know where and when the actual paging message is transmitted. Hereafter, this L1/L2 signaling and the actual paging message are referred to as paging DCI (Downlink Control Information) and paging message, respectively. This behavior is also adopted in NR, at least as baseline. Moreover, in the context of NR, the paging DCI is contained in a set of resources generally called CORESET (Configuration REsource SET). Thus, the UE needs to locate and received the paging CORESET in order to receive the paging message.

In LTE, the paging DCI/message are broadcasted in the cells of the tracking area, while in NR, beam operation is supported in general, i.e., paging messages are transmitted in different directions in different time slots.

In order to allow an energy-efficient operation in LTE, IDLE mode UEs sleep most of the time, and wake up only when they are potentially paged. The time-instances in which UEs can be paged are called Paging Occasion (PO), and hence, a paging cycle is defined. By means of predefined formulas, using the UE ID and other parameters, each UE determines when, i.e., the PO (frame and subframe), it must monitor paging. Hereafter, this is referred to as PO calculation. In NR, similar behavior is expected, although with some differences. UEs also determine the time-location of their corresponding PO using predefined formulas, and monitor POs periodically. However, to support beam sweeping operation, PO is defined as a time interval, possibly composed of several time-slots (in which all the required beams are transmitted). Hence, what UEs would determine by means of the PO calculation would be the starting time of the PO. Thus, in principle, the UE would have to listen during the whole PO interval to verify whether a paging message, relevant to it, has been sent; a behavior that is not efficient from the energy consumption point of view.

In LTE, PO indicates a frame and subframe in which the paging DCI is possibly transmitted (using a reserved ID: P-RNTI). In NR, the operation is more flexible. The paging CORESET can be transmitted in different OFMD symbols (hereafter symbols) within the slot, and its duration is also variable, i.e., paging CORESET duration can be one or more symbols. Thus, to indicate a UE the exact time-location of the paging CORESET to be monitored, an indication with resolution of symbols is required. Recall that slots are composed of 14 symbols in the time domain.

As indicated before, one key aspect of NR is the support for beamforming based operation. One important function in cellular system is to provide a reliable time-frequency reference for the UEs. While in LTE the signal used for this purpose is broadcasted in the cell, in NR, this signal needs to be transmitted in different directions (beams) at different time instants. Thus, SSBs are defined containing time-frequency reference and information to allow the UE to access the system. Since SSBs are respectively transmitted in all directions, it is possible, in principle, for a UE to catch, i.e., to be able to successfully receive, at least one of those time-multiplexed SSBs, and eventually access the system. Hence, a UE is self-located by means of the SSB it receives. Since 1) these signals are monitored periodically for other purposes, e.g., radio resource management, and 2) in principle even IDLE UEs can always determine the SSB they belong to, then it is possible to use this knowledge to know when the PO (the one to be transmitted in that direction) will be transmitted, as long as some association exists, and it is signaled to or known by the UEs. This disclosure is about the schemes to create and signal those associations.

For paging in multi-beam operation, support beam sweeping for paging, and study the following methods:
  Alt-1: Multiplexing paging with SS blocks (paging details left for further study)
  Alt-2: Adding another round of beam sweeping for paging (Note: Another round of beam sweeping is different from the beam sweeping of SS burst set)
  Other alternatives are not precluded. Companies report their assumption for paging
Support the paging channel design at least for RRC idle mode as follows: Paging message is scheduled by DCI carried by NR-PDCCH and is transmitted in the associated NR-PDSCH
For paging, RAN1 (3GPP working group on Radio Access Network, layer 1) will likely down-select from the following options:
  Option 1: Paging DCI followed by Paging Message
    Note: These do not imply that they are consecutive
  Option 2: Paging group indicator triggering UE feedback and Paging DCI followed by Paging Message
  Option 3: Paging group indicator and Paging DCI followed by Paging Message
  Option 4: Paging DCI indicates use of Option 1 or 2.
RAN2 (3GPP working group RAN, layer 2) will clarify whether Paging DCI and Paging Message can be in the same or different POs, including the above options
At least Option 1 (Paging scheduling DCI followed by Paging Message) is supported
  Paging scheduling DCI and Paging Message are sent at least in the same slot
  NR supports LTE-like UE grouping where UE is specifically configured of its PO/slot. This is considered part of Option 1.
  Details of UE grouping are up to RAN2.
At least some parameters for Paging Occasions are explicitly signaled.

RAN1 understands this includes at least periodicity for the UE to monitor the paging scheduling DC1.

Up to RAN2 to decide whether the above such information is in RMSI or OSI

UE may assume QCL between SS Blocks, Paging DCIs and Paging Messages

The details on the associations between SS blocks and possible subsets of Paging DCI/Messages are for further study.

In summary, some relevant agreements within 3GPP can be summarized as follows

In NR (similarly to LTE) paging is a network-initiated mechanisms to locate an IDLE mode UE within a tracking area (possibly composed of multiple cells), and then, to start a connection setup.

RAN1 #87, support for paging in multi-beam operation was agreed. A later agreement in RAN1 #88 further details that paging message is scheduled by DCI carried by NR-PDCCH and is transmitted in the associated NR-PDSCH.

In RAN1 NR #3, several paging mechanisms were proposed, and in the last meeting, RAN1 90b, agreements include the following:

at least the Option 1, i.e., paging DCI followed by paging message, is supported, at least some parameters for Paging Occasions (PO) are explicitly signaled, and UE may assume Quasi-colocation (QCL) between Synchronization Blocks (SSBs) and paging signals (DCI and message)

The details on the associations between SSBs and possible subsets of paging DCI/message were left for further study.

It was also agreed (RAN1 #90b) that the time-location of the actually transmitted SSB are signaled in remaining minimum system information (RMSI).

In NR, UE are also expected to wake-up periodically to monitor the corresponding PO (similar behavior of LTE).

In the LTE and likely also in the NR, In the case of initial synchronization (when the UE is not already camping on or connected to an LTE cell) after detecting the synchronization signals, the UE decodes the Physical Broadcast CHannel (PBCH), from which critical system information is obtained. In particular, the PSS and SSS are transmitted periodically and enable the terminal to acquire slot boundary timing. Then, the PBCH of the cell may be read carrying configuration information. Configuration information may be a common configuration information which is to be read by all terminals and/or a group of terminals. This may include for instance the configuration of the cell resources such as paging resources. The RMSI and OSI mentioned above are resources pointed to from the PBCH and also carrying (cell) broadcast common information to be read by any terminal in the cell. This information may also carry configuration. The configuration information may be carried by the resource control protocol (RRC).

Figure 1:
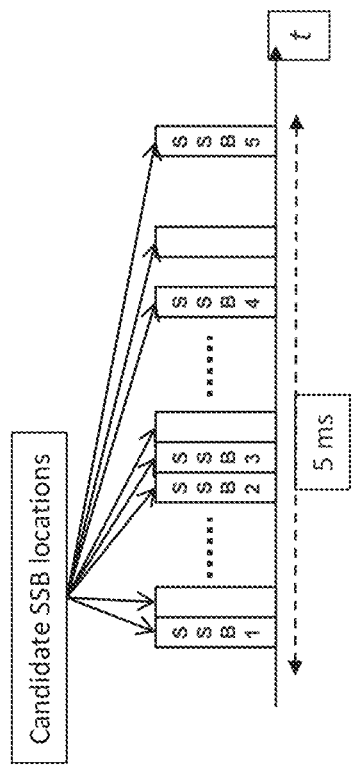
FIG. 1 is a schematic drawing of the allocation of synchronization blocks in resources.

FIG. 1 depicts the rationale of using several blocks as a mean for time/frequency synchronization in NR. The candidate SSB locations, as well as the total number of them, may be provided in a standard and be numerology-specific, with a maximum of L=64 SSB for subcarrier spacing of 240 KHz. A numerology is defined by subcarrier spacing and cyclic prefix (CP) overhead. In FIG. 1, candidate locations are represented as boxes. In this representation, 5 out of L=8 possible SSB are actually transmitted (indicated by their respective SSB index, "SSB1", "SSB2", etc.) by the network and signaled through RMSI. Herein, this indication is represented by the bitmap B1=10110101. In general, the base station (referred to in NR as gNB and similar to the eNB/eNodeB of LTE) transmits the different SSBs using different beams in different time-instants to cover the cell/sector, as illustrated in FIG. 2.

It should be noted that a UE monitors the SSB in order to perform some other functions, e.g., Radio Resource Management (RRM) (for instance handover), and hence, UE is aware of the best received beam. Moreover, since the gNB does not know the location of IDLE mode UEs within a tracking area, paging messages also need to be beam-swept, thus a natural design is to associate the operation of SSB and paging.

A key agreement for this disclosure among the above agreements states that QCL (Quasi-colocation) between SSBs and paging (DCI/message) can be assumed by the UEs. The notion of quasi-co-location (QCL) means that, the radio channels experienced by signals transmitted by different antenna ports have the same large-scale properties (e.g., average delay spread, Doppler spread/shift, average gain, etc.) if and only if they are quasi-co-located. In practice, it means that signals corresponding to two different channels (e.g., SSBs and paging) are transmitted from the same Transmission and Reception Point (TRP), using the same beam construction. The agreement is important because it creates a link between each SSB and the paging messages through QCL, and it was left undecided how to make/create such associations, which is an aim of this disclosure.

As it is described before, for a UE to monitor the whole PO, in which potentially many paging messages are transmitted in different directions, is not efficient. It would be desirable to take advantage of the QCL principle and the fact that both paging and SSBs need to be beam swept in the cell by creating a link between each SSB and the corresponding/relevant paging message.

Figure 3:
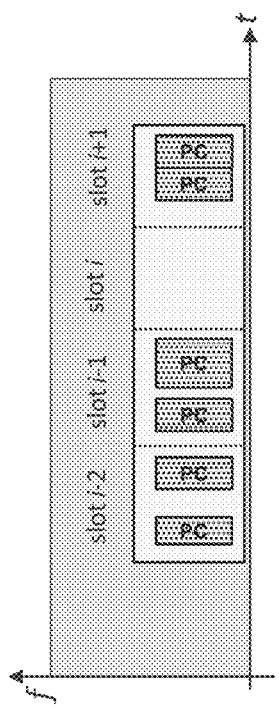
FIG. 3 is an illustration of the allocation of paging information in resources.

In NR, according to RAN2 understanding, a paging occasion (PO) is defined as the time interval over which paging signals (DCI or message) are transmitted, and it is composed of one or multiple time-slots. FIG. 3 shows a PO including paging CORESETs (PC).

Similarly to LTE, a UE needs to determine the time location of its corresponding PO. Herein, this is referred to as PO calculation. For instance, the PO calculation can have as input UE ID, other system parameters, and in case of NR, corresponding (best) SSB index of the UE can also be used in order to exploit QCL between SSB and paging.

However, and in general, it is desirable to avoid the UE to monitor the whole PO where several paging CORESET are transmitted using different beams, which can be inefficient (energy costly). Hence, taking advantage of the QCL is a preferred approach.

Thus, an aim of the present disclosure can be stated as how to associate and signal the SSB-to-CORESET mapping, so that each UE focuses exclusively on its corresponding paging CORESET.

An exemplary idea of the disclosure is to indicate to UEs their corresponding paging CORESET symbol/slot offset (within the PO) with respect to the PO's first slot/symbol or SSB symbol/slot via RMSI or OSI (other system information).

To carry out this idea, the following steps may be performed:

1. PO calculation, possibly including the SSB index, is required to obtain the PO's first symbol/slot. The LTE paging formula specified in (3GPP TS 36.304, v.

14.4.0, "User Equipment (UE) procedures in idle mode", Section 7) is the basis.

2. Once the PO's first symbol/slot is obtained, the offset (shift) with respect to it, as indicated in the main idea, is determined to indicate the exact position of the relevant paging CORESET.

Figure 4:
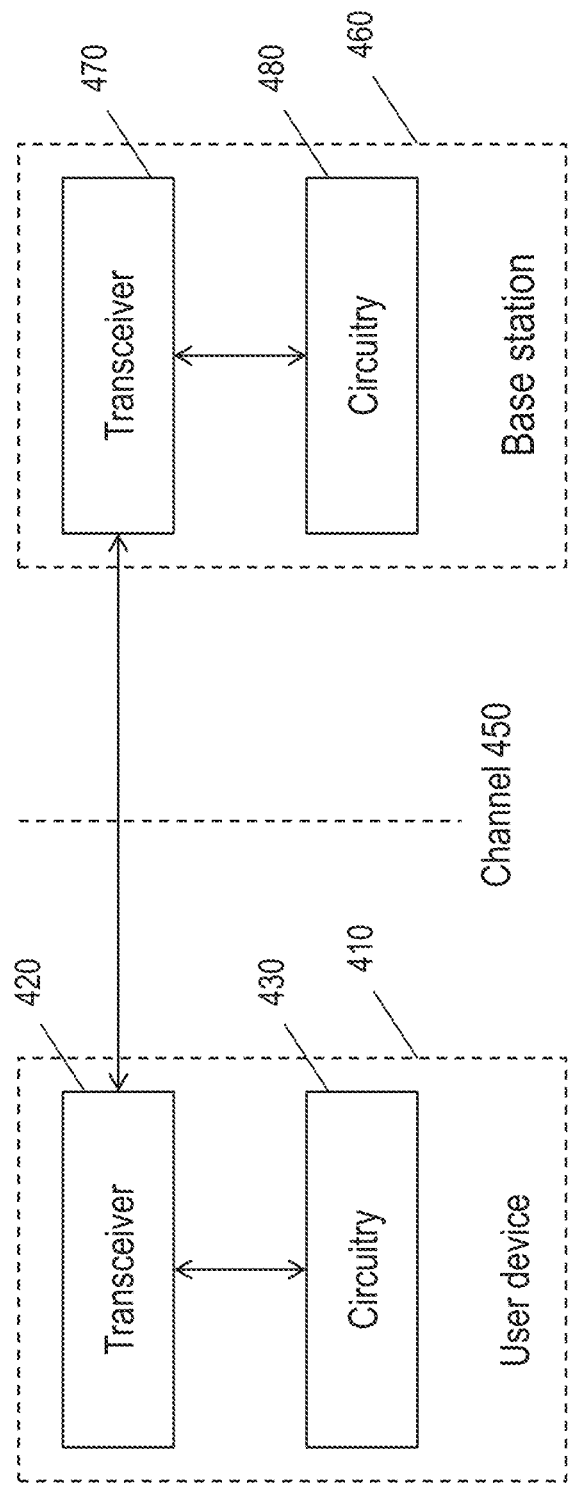
FIG. 4 is a block diagram of a base station and a transmission device according to an embodiment.

A user device according and a base station corresponding to an exemplary embodiment of the present disclosure are shown in FIG. 4. The user device 410 (i.e., user equipment (UE) or user terminal) and the base station 460 (i.e., a gNB of NR) communicate with each other over a wireless channel 450.

The present disclosure relates to transmission and reception of paging signals and in particular to determination of location for the paging signals.

In order to efficiently signal the paging information, in some embodiments, the location of the paging information is determined by a starting point and one or more offsets of the respective resources actually used for carrying paging information. The offsets are defined with respect to the starting point.

In general, paging information may be transmitted by the network (e.g. base station on the wireless interface) in a paging region of the system resources. The paging region is to be read by a group of terminals (which may be all terminals). In order to save power, the terminals only read paging resources which are configured to carry the paging information, among the resources generally configurable by the network to carry the paging information.

According to an embodiment, the user device 410 shown in FIG. 4 comprises a transceiver 420 including a transmitter and/or receiver for transmitting and/or receiving data to/from the base station, and circuitry 430.

The processing circuitry 430 of the user device 410, in operation, calculates the starting location of a paging region comprising resources in which user devices are paged, the paging region including paging information for paging said user device. Furthermore, the circuitry determines an offset with respect to the starting location of the paging region. The offset with respect to the starting location of the paging region indicates the location of the paging information (e.g. CORESET position) for paging said user device relative to the starting location of the paging region. Moreover, using the paging information located as indicated by the starting location and the offset with respect to the starting location, the circuitry of the user device, in operation, performs paging of the user device.

The base station 460 comprises processing circuitry 480 which, in operation, determines a paging region in which user devices are paged. Moreover, the circuitry 480 determines an offset with respect to a starting location of the paging region, the offset indicating the location of the paging information for paging said user device relative to a starting location of the paging region, and allocates the paging information for paging said user device to a resource on the location indicated by the offset. The base station 460 further comprises a transmitter 470 (transceiver) which, in operation, transmits the paging information on the resource indicated by the offset to the user device.

Further disclosed is a data transmission and/or reception method to be performed by a user device transmitting and/or receiving data to/from a base station in a communication system. The method comprises the step of calculating the starting location of a paging region comprising resources in which user devices are paged, the paging region including paging information for paging said user device. The method also comprises the step of determining an offset with respect to the starting location of the paging region, the offset indicating the location of the paging information for paging said user device relative to the starting location of the paging region.

Also disclosed is a data transmission and/or reception method to be performed by a base station in a communication system. The method comprises the steps of determining a paging region in which user devices are paged, determining an offset with respect to a starting location of the paging region, the offset indicating the location of the paging information for paging said user device relative to a starting location of the paging region, allocating the paging information for paging said user device to a resource on the location indicated by the offset, and transmitting the paging information on the resource indicated by the offset to the user device.

In the described operations of user device 410 and base station 460, the paging region may correspond to the paging occasion (PO) described above. Accordingly, the starting location of the paging region may correspond to a location at a boundary of the paging region, for instance the first slot or first symbol in time direction (i.e. the direction of slot/symbol numbering). The paging region is a region within resources of the communication system. The paging region may start with a first resource which is configurable in the communication system to carry paging information. However, more generally, the starting location may also be understood to refer to an arbitrary location (e.g. slot or symbol), possibly within the paging region, relative to which an offset indicating a location of the paging information is determined.

For instance, the paging information for paging the user device 410 corresponds to the paging CORESET described above. The offset indicates the position of the paging information (e.g. the CORESET position) relative to the starting location of the paging region. Thus, the offset corresponds to a shift from the starting location to the position of the paging information for the paging the user device, or, in other words, to a distance between the starting location of the paging region and the actual paging information for the user device.

In an exemplary embodiment the resources in which user devices are paged are resources in the time domain. Accordingly, the starting location of the paging region and the location of the paging information for paging said user device are locations of resources in the time domain. Then, for instance, the starting location of the paging region may indicate a symbol or a slot. Accordingly, also the offset indicating the location of the paging information for paging said user device indicates a symbol and/or a slot. However, the present disclosure is also applicable to a case where the location in the frequency domain (i.e. carrier or subcarrier/subcarriers) in which the paging information for paging the user device are located in the transmission/reception. If the latter is not the case, the location/locations of the paging information in frequency domain may be determined in another manner, for instance signaled.

However, the present disclosure is not limited to any particular approach and, in addition or alternatively, the frequency resources may be determined by means of blind decoding using a predetermined raster (predetermined patterns of synchronization signals in the respective subcarriers).

The synchronization and paging procedures share some common features such as being transmitted from the same (or substantially the same) transmission and reception point (TRP), such as a base station, using the same beam construction. Thus, it may be practical to associate these two procedures. The synchronization resources may be synchronization blocks (SSBs). One SSB may be defined by its location among the communication system resources. For example, in NR, the SSBs may be given as blocks in time-frequency grid, i.e. as a certain number of symbols (in time domain) and subcarriers (in frequency domain).

Regarding the determination of the paging region such as the PO, there are two alternative exemplary possibilities: A paging region common to all SSBs (Embodiment 1 illustrated in FIG. 5) and a paging region specific for respective SSBs (Embodiment 2 illustrated in FIG. 6) which will be explained in the following.

Embodiment 1

Figure 5:
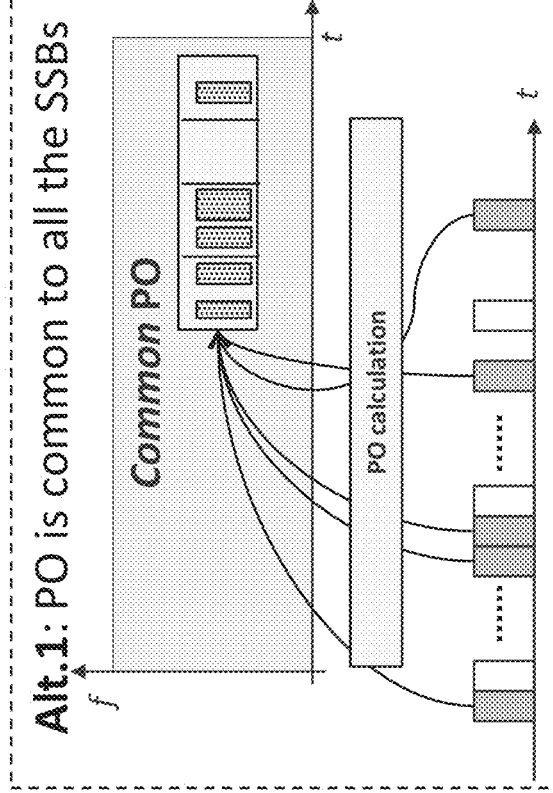
FIG. 5 is a schematic illustration of calculation of a paging region according to an embodiment.

The paging region is common to all SSBs, i.e. the paging region is a common paging region common for each of a plurality of synchronization blocks. Then, the starting location of the paging region (i.e. the first slot or symbol of the PO) is unique and common for all SSBs transmitted by the base station in the respective beams corresponding to different directions. This means that all candidate locations for the paging information associated with respectively different beams are adjacent to each other. Accordingly, the paging region and, thus, its starting location calculated by the circuitry of the user device, is the same irrespective of which of the several beams a user device catches and which SSB transmitted on the respective beam the user device receives. Such a common PO is shown in FIG. 5.

Embodiment 1 includes, for instance, association methods to indicate (e.g. via RMSI or OSI) the offset symbol/slot of the paging CORESET in cases where the PO is common to all SSBs. The methods include symbol/slot paging bitmap, absolute and relative symbol offset depending on the type of value calculated in the PO calculation, and combination to indicate the slot offset from a given slot/symbol and the symbol index/offset within the slot.

In the following, several exemplary alternatives are described that are associated with Embodiment 1 (common paging region). Therein, the UE will perform the PO calculation, and from that, it will obtain the starting location (e.g., in time domain, the starting symbol/slot of the PO) which is also denoted hereafter as X.

In some exemplary embodiments associated with alternative 1), the circuitry of the user device, in operation, further receives, from the base station, an indicator of the offset of the paging location for paging the user device with respect to the starting location of the paging region. To this end, the target location of the paging information (e.g. the target paging CORESET) for the user device is transmitted by the base station using several different exemplary options. In the following, several examples of transmitted/received indicators indicative of the offset are described. For instance, the indicator of the offset is included in remaining minimum system information, RMSI, or other system information, OSI transmitted by and received from the base station.

Example 1-1

For instance, the information indicative (i.e., the indicator) of the offset is a paging bitmap indicative of locations of paging information within the paging region including the paging information for paging said user device. The paging bitmap consists of bits each of which corresponds to a resource unit (e.g. resource block, slot) assigned to a location of paging information such as a paging CORESET. The respective resource units carry a configuration resource set actually carrying paging information for user devices. The paging occasion is a resource unit of a set of resource units configurable by the base station to carry paging information.

For instance, the user device, in particular its processing circuitry, further receives, from the base station, a synchronization bitmap indicative of a plurality of locations in which synchronization blocks are transmitted among a set of candidate locations for transmitting synchronization blocks. From the plurality of locations indicated by the synchronization bitmap, the user device then determines an ordinal value of a location of a synchronization block most suitable for synchronization of said user device. Therein, the ordinal value of the synchronization block most suitable for synchronization of said user device corresponding to an ordinal value of the location of the paging information for paging said user device as indicated by the first bitmap.

Thus, the user device determines the location of paging information among the bits set to one of the paging bitmap as corresponding to the ordinal value determined within the synchronization bitmap. Therein, the user device makes use of the communication system applying beamforming wherein beams pointing into different directions carrying respective synchronization blocks are cyclically switched. The determination of the ordinal value of the most suitable synchronization block corresponds to catching the "best beam" among the beams. For a user device, the best beam is the beam from which the user device detects most energy, i.e., the better-detected one. Typically a user device will be able to detect energy only from one beam depending of the position of the user device relative to the base station/TRP (unless the user device is located in a boundary area between areas covered by two different beams). The user device knows the ordinal number of the best beam because the different beams associated with the respective ordinal numbers are transmitted during different predetermined time intervals that are known to the user device. The user device performs determination of the location of the paging information by counting, from the paging bitmap the bits indicating the time locations where paging information is actually transmitted. For instance, a value "1" represents a candidate location with paging information, and a value "0" represents a candidate location without paging information. If the nth SSB is the SSB associated with the best beam, then the nth bit of the bits indicating actual locations paging information among the candidate locations indicates the location of the paging information for paging the particular user device.

In accordance with the above description, for instance, the paging bitmap is a bitmap over the period of multiple slots/symbols from the slot/symbol X. Each bit represents a symbol or slot and depending on its value, the UE knows whether a paging message or paging CORESET is transmitted or not in the respective symbol or slot. In this case the connection with the SSBs would be given by the ordinal of the actually transmitted best SSB of the UE.

Figure 7:
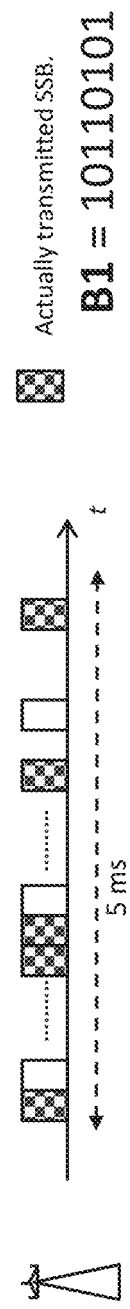
FIG. 7 is an illustration of indication of synchronization blocks by a synchronization bitmap.

An example of actually transmitted SSBs among candidate locations is shown in FIG. 7. The gNB transmits N SSBs out of the L possibilities. In the example N=5, L=8 and slot level indication is assumed. Similar to FIG. 1, the figure illustrates how the network indicates by means of a synchronization bitmap B1 which SSB are actually transmitted from the set of candidate locations (as in FIG. 1, B1=10110101). Thus, UEs can determine the ordinal of the best SSB.

Figure 8:
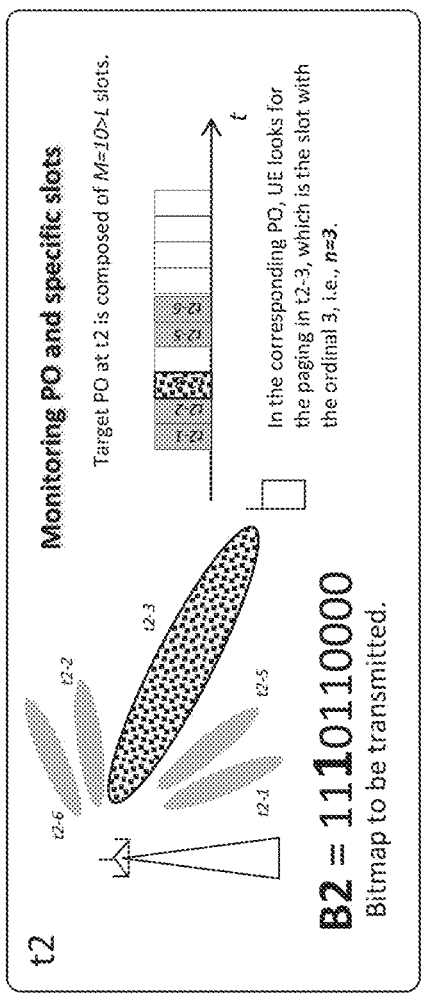
FIG. 8 is an illustration of the determination of a most suitable synchronization block.
Figure 9:
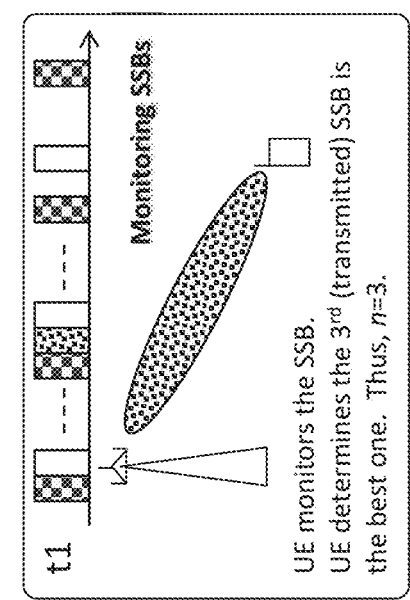
FIG. 9 is an illustration of determining a location of paging information using a paging bitmap.

FIGS. 8 and 9 show an example in which the UE is able to detect at t11 the $3^{rd}$ SBB and determine the corresponding ordinal (3rd). The target PO is composed of M=10 slots in which paging CORESET can be transmitted. At t2, given that the paging bitmap B2 (of length 10, B2=1110110000) is transmitted, the UE can, using the ordinal value (3), determine the symbol/slot (the example assumes slot-level indication) in which the relevant paging message is transmitted, i.e., the slot with the $3^{rd}$ '1' in B2. In the corresponding PO, UE looks for the paging in t2-3, which is the slot with the ordinal 3, i.e., n=3. The paging bitmap indicates the slot position (offset within the PO) in which the relevant paging CORESET is located. Within the slot, the symbol index can be obtained using a formula taking into account, for instance, the corresponding best SSB beam/index. The assumption of slot-level indication in FIGS. 8 and 9 is merely exemplary. As an alternative example, symbol-level indication is also possible.

Figure 10:
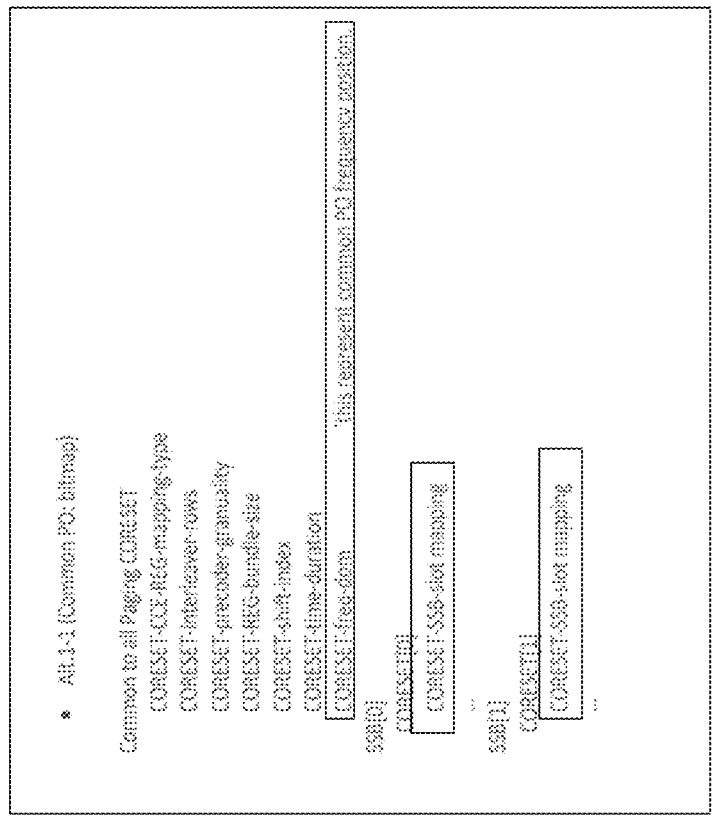
FIG. 10 is an example of RRC signaling according to an embodiment.

A Radio Resource Control (RRC) signaling example in accordance with example 1-1 is shown in FIG. 10. Portions that are newly added in accordance with the present disclosure are indicated by boxes. In particular, the RRC signaling may be carried in the broadcast system resources such as physical broadcast channel (PBCH) and/or in the RMSI or OSI.

As can be seen in FIG. 10, information elements common to all paging CORESETs include, CORESET-CCE-REG-mapping-type, CORESET-interleaver-rows, and others. In addition, an information element CORESET-freq-dom has been added to indicate the frequency resources used to carry the paging CORESET. The CORESET-freq-dom thus represents the common PO position in the frequency domain. This may be a particular subcarrier and/or resource block or the like. It is noted that in general, the frequency domain resources does not have to be signaled and may also be prescribed by a standard.

Apart from the common information for all paging CORESET, the RRC signaling example of FIG. 10 comprises information related to particular SSBs. For instance, in this example, an information element CORESET-SSB-slot mapping has been added to each CORESET information corresponding to the respective SSBs. The CORESET-SSB-slot mapping may be, for instance, bitmap B2 as described above. Accordingly, a terminal (UE) which reads any of the broadcast SSBs obtains the information B2 and based thereon may access the relevant paging information.

In FIG. 10, there are only SSB[0] and SSB[1] shown, corresponding to the respective CORESETs [0] and [1]. However, in general, there may be more SSBs/CORESETs defined by an index i (SSB[i] and CORESET[i]). Since the CORESET-SSB-slot mapping is defined in each of the SSBs, the user terminal is able to retrieve its value independent of the particular beam it catches. The number and the order of beams are configurable.

Example 1-2

In other examples of Embodiment 1, the value indicating the absolute symbol offset with respect to symbol X, or the symbol index in case X represents a slot.

Figure 11:
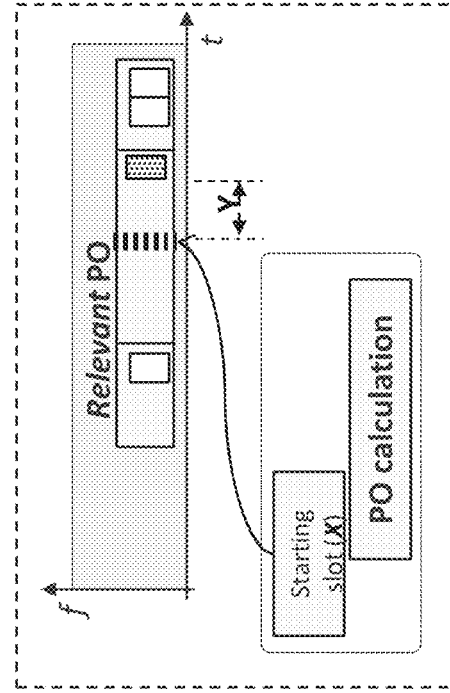
FIG. 11 is an illustration of determining a location of paging information using a signaled offset value.

For instance, the calculated starting location indicates a symbol and the indication of the offset is a value indicating the absolute symbol offset with respect to the starting. This case is shown in FIG. 11: the starting location (starting symbol) of the PO (X) is obtained by means of the PO calculation. Here, the value Y representing the offset in terms of symbols with respect to X is indicated.

Figure 12:
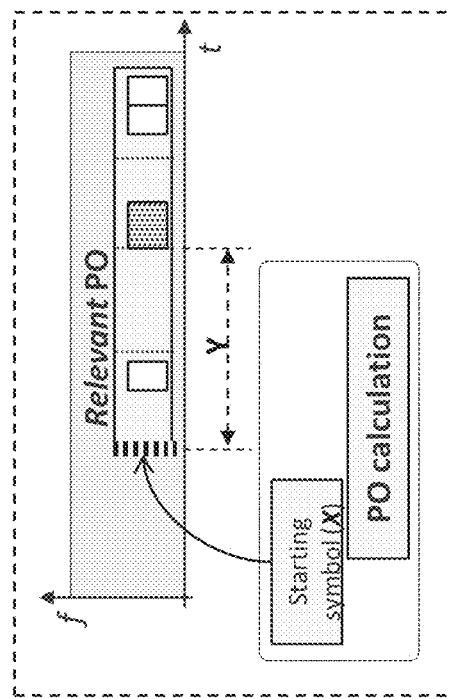
FIG. 12 is an illustration of determining a location of paging information using a signaled offset value.

Alternatively, the calculated starting location indicates a slot and the indication of the offset is a symbol index within the slot of the starting location. This case is shown in FIG. 12: the starting slot of the PO (X) is obtained by means of the PO calculation. Here, the value Y indicates the symbol index (offset) within the slot denoted by X. It should be noted that in this case, the starting location of the PO refers to a slot, while Y indicates a symbol.

Figure 13:
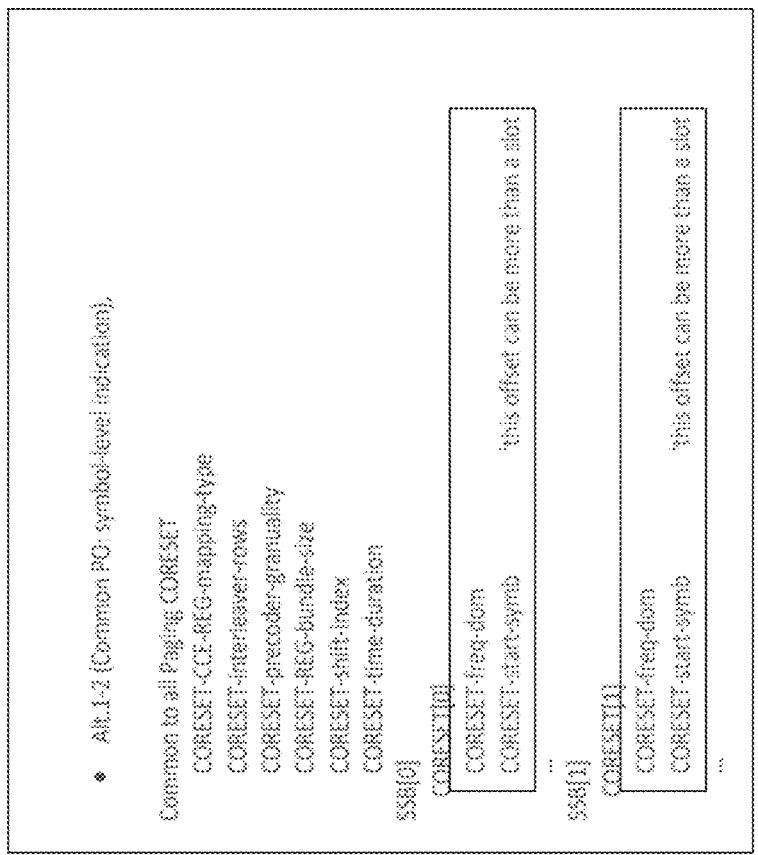
FIG. 13 is an example of RRC signaling according to an embodiment.

An RRC signaling example in accordance with example 1-2 is shown in FIG. 13. Again, portions that are newly added in accordance with the present disclosure are indicated by boxes. Also in this case, common information elements include CORESET-CCE-REG-mapping-type, CORESET-interleaver-rows, etc. In contrast to example 1_1, no element needs to be added to the information common to all SSBs.

However, also the signaling example of FIG. 13 comprises information relevant to the particular SSBs. In particular, the element CORESET-freq-dom is signaled in the information directed to the individual SSBs, such as SSB[0] and SSB[1], in this example. Moreover, another signal element, CORESET-start-symb indicating, for example, the frequency offset as an absolute symbol value within a slot, has been added to the signaling sections directed to the individual SSBs. Again, there be more signaling regions for additional SSBs than SSB[0] and SSB[1] depicted in the figure.

Alternative 1-3

In further examples of Embodiment 1, the offset with respect to the starting location is a combination indicating the slot offset with respect to symbol X, and the symbol index in the slot. That is, the calculated starting location indicates a symbol and the indication of the offset is a combination of a slot offset with respect to the symbol of the starting location and a symbol index within the slot indicated by the slot offset.

Figure 14:
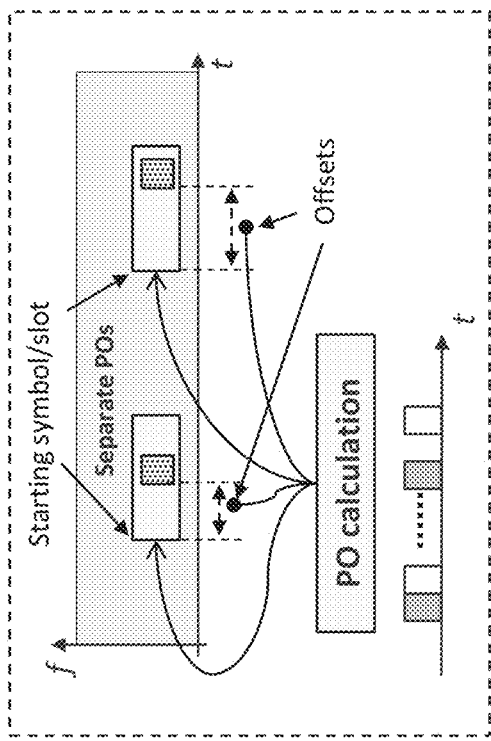
FIG. 14 is an illustration of determining a location of paging information using signaled offset values.

An example of alternative 1-3 is shown in FIG. 14. The figure shows an exemplary case where the starting location X, obtained by means of the PO calculation, represents an arbitrary symbol. Here, the value Y represents a combination indicating the slot offset (with respect to X) and the symbol index/offset within the slot denoting the paging CORESET location. That is, the value to be transmitted Y indicates a combination providing the slot offset (2 in the example) and the symbol index within the targeted slot (slot i in the example). In addition, The frequency position for the corresponding SSB can be indicated as an offset.

Figures 15, 17:
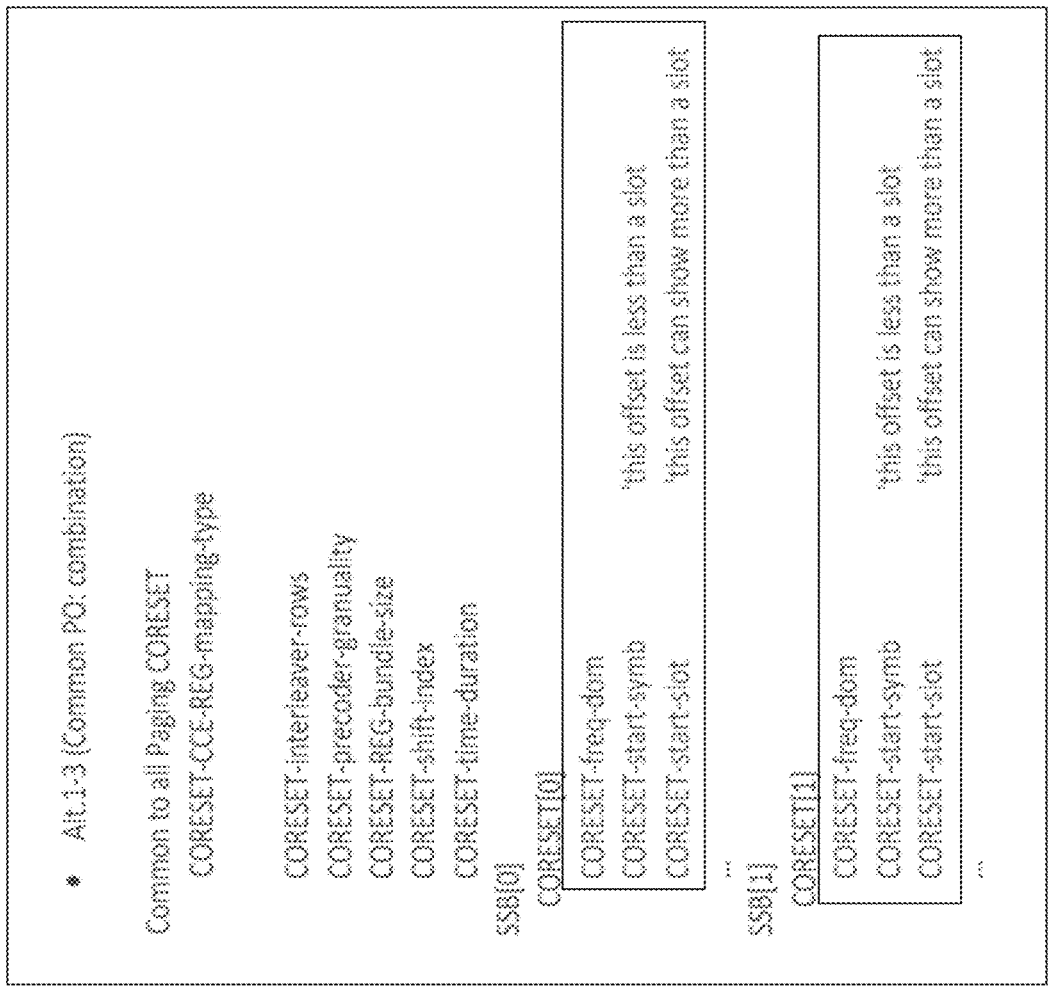
FIG. 15 is an example of RRC signaling according to an embodiment.
FIG. 17 is an example of RRC signaling according to an embodiment.

FIG. 15 shows an RRC signaling example in corresponding to alternative 1-3, where, again, portions that are newly added in accordance with the present disclosure are indicated by boxes. Also here, the elements CORESET-CCE-REG-mapping-type, CORESET-interleaver-rows, CORESET-bundle-size, etc., common to all Paging CORESETs are signaled in the region which is common for all Paging CORESETS, as can already be seen in FIG. 13. Also, as in FIG. 13, CORESET-freq-dom and CORESET-start-symb are signaled in the signaling regions SSB[0], SSB[1], etc., directed, respectively, to the particular SSBs. In addition, CORESET-start-slot is signaled for the respective SSBs. Herein, the two elements CORESET-start-slot and CORESET-start-symbol correspond, respectively, to the values indicating, respectively, the slot offset and the symbol index within the slot. Since a slot is composed of 14 symbols in the time domain, four bits are sufficient to signal the value of CORESET-start-symbol.

Embodiment 2

Figure 6:
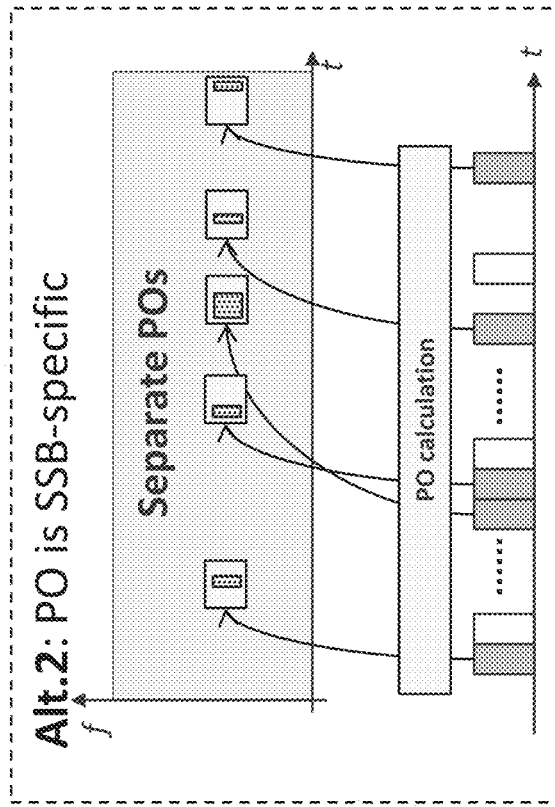
FIG. 6 is a schematic illustration of calculation of a paging region according to another embodiment.

The paging region is specific to the different SSBs transmitted respectively on the different beams, a respective paging region from a plurality of paging regions comprising the paging region including paging information for paging said user device is associated with a respective synchronization block. In this case, each SSB corresponding to a particular beam has its corresponding paging region. The different paging regions corresponding respectively to the different beams/SSBs may be separated from each other by resources (e.g., in the time domain, one or more slots or symbols) not belonging to any paging region. Depending on the particular beam that a user device catches, a different starting location is obtained in the calculation of the paging region. Separate SSB/beam specific paging regions (POs) are shown in FIG. 6.

Embodiment 2 includes an association method to indicate the offset symbol/slot of the paging CORESET in cases where the PO is SSB-specific. The association will be based on PO calculation to obtain the staring symbol/slot of the PO and the symbol/slot offset.

Figure 16:
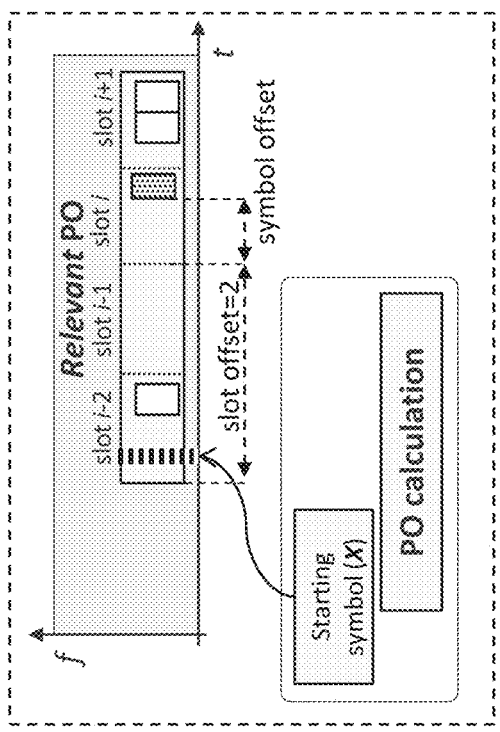
FIG. 16 is an illustration of determining a location of paging information using paging occasion (PO) calculations.

Another example of separate paging regions (POs) is shown in FIG. 16. In this case, the POs are specific to the respective SSBs (beams). Again, two variables are required for determining the location of the paging CORESET: the starting symbol/slot of the PO, and the symbol/slot offset with respect to it.

In an example of embodiment 2, the circuitry, in operation, calculates the starting location of the paging region and determines the offset indicating the location of the paging information by performing respective paging occasion, PO, calculations. The UE performs the PO calculations, and therefrom, it will obtain 1) the starting symbol/slot of the PO and 2) the corresponding symbol/slot offset with respect to the starting symbol/slot of the PO. This behavior is illustrated in FIG. 16. As depicted in the figure, both absolute time-location of the PO and relative CORESET position within the PO are SSB-specific and can be obtained from the PO calculation.

One possible example would be, the equation to obtain PO by the following equation:

$$i\_s = \text{floor}(UE\_ID/N) \bmod Ns + SSB\_index\_number * OffsetBetweenCORESET,$$

with
SSB_index_number is to count n th SSB index number in TDMed SSBs,
Ns=number of Positions/locations,
N=min(T, nB), meaning the minimum (smallest value) one among T and nB.
nB can be any one of 4T, 2T, T, T/2, T/4, T/8, T/16, T/32, which comes from SIB2 (IE nB). Tis DRX cycle of the UE. OffsetBetweenCORESET is the symbol distance between two CORESETs.

Then each PO position can be obtained directly by the above equation. Such a PO calculation corresponds to the PO calculation in as it is done in LTE (using the LTE paging formula specified in TS 36.304, Sec. 7: page 39, incorporated herein by reference).

Since the starting location of the paging region and the offset can be calculated by means of PO calculations performed by the user device, no additional signaling needs to be introduced. Accordingly, RRC signaling can be performed by the base station as shown in FIG. 17. As can be seen, only the common signaling to all paging CORESETs is performed with the same elements as in the examples of FIGS. 13 and 15, such as CORESET-CCE-REG-mapping-type, CORESET-interleaver-rows, CORESET-bundle-size, etc., However, no new elements need added for signaling the location of the paging region, neither in the common signaling to all paging CORESET nor in the SSB-specific signaling. This is because the offset of the CORESET location relative to the starting location is calculated by the user device in a PO calculation rather than being received in the signaling.

The proposed embodiments provide flexibility to signal the location of the target PO under several assumptions, i.e., common PO for different SSBs or SSB-specific PO. Moreover, a UE is not required to monitor all the possible paging-carrying instances (slot or symbols) within the PO.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may have a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

According to one general aspect, a user device for transmitting and/or receiving data to/from a base station in a communication system is provided. The user device comprises circuitry which, in operation, calculates the starting location of a paging region comprising resources in which user devices are paged, the paging region including paging information for paging said user device; and determines an offset with respect to the starting location of the paging region, the offset indicating the location of the paging information for paging said user device relative to the starting location of the paging region.

In some embodiments, the circuitry of the user device, in operation, further receives, from a base station, an indication of the offset with respect to the starting location of the paging region; and determines the offset to obtain the location of the paging information for paging said user device based on the information received from the base station.

In an exemplary embodiment, the indicator of the offset is a paging bitmap indicative of locations of paging information within the paging region including the paging information for paging said user device.

For example, the circuitry of the user device further receives, from the base station, a synchronization bitmap indicative of a plurality of locations in which synchronization blocks are transmitted among a set of candidate locations for transmitting synchronization blocks, and determines, from the plurality of locations indicated by the synchronization bitmap, the ordinal value of the location of a synchronization block most suitable for synchronization of said user device. Therein, the ordinal value of the synchronization block most suitable for synchronization of said user device corresponds to an ordinal value of the location of the paging information for paging said user device as indicated by the first bitmap.

In another exemplary embodiment, the calculated starting location indicates a symbol and the indication of the offset is a value indicating the absolute symbol offset with respect to the starting.

In a further exemplary embodiment, the calculated starting location indicates a slot and the indication of the offset is a symbol index within the slot of the starting location.

In another exemplary embodiment, the calculated starting location indicates a symbol and the indication of the offset is a combination of a slot offset with respect to the symbol of the starting location and a symbol index within the slot indicated by the slot offset.

For instance, the indicator of the offset is included in remaining minimum system information, RMSI, or other system information, OSI received from the base station.

In another exemplary embodiment, the circuitry of the user device, in operation, calculates the starting location of the paging region and determines the offset indicating the location of the paging information by performing respective paging occasion, PO, calculations.

In some embodiments, the paging region is a common paging region common for each of a plurality of synchronization blocks.

In other embodiments, wherein a respective paging region from a plurality of paging regions comprising the paging region including paging information for paging said user device is associated with a respective synchronization block.

In some embodiments, the starting location of the paging region and the location of the paging information for paging said user device being locations of resources in the time domain.

For instance, the starting location of the paging region indicates a symbol or a slot.

In some embodiments, the offset indicating the location of the paging information for paging said user device indicates a symbol and/or a slot.

Further provided is a base station for transmitting and/or receiving data to/from a user device in a communication system. The base station comprises circuitry which, in operation, determines a paging region in which user devices are paged. The circuitry further determines an offset with respect to a starting location of the paging region, the offset indicating the location of the paging information for paging said user device relative to a starting location of the paging region. The circuitry also allocates the paging information for paging said user device to a resource on the location indicated by the offset. The base station also comprises a transmitter which, in operation, transmits the paging information on the resource indicated by the offset to the user device.

According to another general aspect, data transmission and/or reception method to be performed by a user device transmitting and/or receiving data to/from a base station in a communication system is provided. The method comprises the steps of calculating the starting location of a paging region comprising resources in which user devices are paged, the paging region including paging information for paging said user device and determining an offset with respect to the starting location of the paging region, the offset indicating the location of the paging information for paging said user device relative to the starting location of the paging region.

Further provided is a data transmission and/or reception method to be performed by a base station in a communication system. The method comprises the steps of determining a paging region in which user devices are paged, determining an offset with respect to a starting location of the paging region, the offset indicating the location of the paging information for paging said user device relative to a starting location of the paging region, allocating the paging information for paging said user device to a resource on the location indicated by the offset, and transmitting the paging information on the resource indicated by the offset to the user device.

Summarizing, the present invention relates to a user device, a base station, and data transmission and reception methods to be performed by a user device and a base station in a communications system. The user device comprises circuitry which, in operation, calculates the starting location of a paging region comprising resources in which user devices are paged, the paging region including paging information for paging said user device; and determines an offset with respect to the starting location of the paging region, the offset indicating the location of the paging information for paging said user device relative to the starting location of the paging region.

The invention claimed is:

1. An integrated circuit for a user equipment (UE) for transmitting and/or receiving data to/from a base station in a communication system, the integrated circuit comprising:
    receiving circuitry, which, in operation, receives, from the base station, a first indication of an offset with respect to a starting location of paging information within a paging region and a second indication; and
    control circuitry, which, in operation,
        determines, based on the first indication of the offset, resources of the paging information for paging the UE, the offset indicating a frequency position indicative of locations of the resources of the paging information within the paging region, and
        determines, based on the second indication, an ordinal value of a location of a synchronization signal block (SSB) in a synchronization bitmap.

2. The integrated circuit according to claim 1, wherein, the control circuitry, in operation, calculates a starting point of the paging region including the paging information for paging the UE, and
    the calculated starting point indicates a symbol, and the first indication of the offset indicates an absolute symbol offset with respect to the starting point.

3. The integrated circuit according to claim 2, wherein the calculated starting point indicates a slot, and the first indication of the offset is a symbol index within the slot of the starting point.

4. The integrated circuit according to claim 2, wherein the calculated starting point indicates a symbol, and the first indication of the offset is a combination of a slot offset with respect to the symbol of the starting point and a symbol index within the slot indicated by the slot offset.

5. The integrated circuit according to claim 2, wherein the control circuitry, in operation, calculates the starting point of the paging region and determines the resources of the paging information by performing paging occasion (PO) calculations.

6. The integrated circuit according to claim 1, wherein the first indication of the offset is included in remaining minimum system information (RMSI) or other system information (OSI) received from the base station.

7. The integrated circuit according to claim 1, wherein the paging region is a common paging region common for a plurality of synchronization signal blocks.

8. The integrated circuit according to claim 1, wherein the paging region is a specific paging region, among a plurality of paging regions, specifically associated with the SSB.

9. The integrated circuit according to claim 1, wherein the starting point of the paging region and the starting location of the paging information within the paging region are positions in a time domain.

10. The integrated circuit according to claim 1, wherein the starting point of the paging region indicates a symbol or a slot.

11. The integrated circuit according to claim 1, wherein the offset indicating the position of the paging information indicates a symbol and/or a slot.

* * * * *